(12) United States Patent
Kim et al.

(10) Patent No.: US 9,621,671 B2
(45) Date of Patent: Apr. 11, 2017

(54) METHOD OF PACKET TRANSMISSION FROM NODE AND CONTENT OWNER IN CONTENT-CENTRIC NETWORKING

(71) Applicant: Samsung Electronics Co., Ltd., Suwon-si (KR)

(72) Inventors: Jae Hoon Kim, Yongin-si (KR); Seog Chung Seo, Seoul (KR); Byoung Joon Lee, Seongnam-si (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 14/090,653

(22) Filed: Nov. 26, 2013

(65) Prior Publication Data

US 2014/0149532 A1   May 29, 2014

(30) Foreign Application Priority Data

Nov. 26, 2012 (KR) .................. 10-2012-0134452
Mar. 21, 2013 (KR) .................. 10-2013-0030394

(51) Int. Cl.
*G06F 15/167* (2006.01)
*H04L 29/08* (2006.01)

(52) U.S. Cl.
CPC ........ *H04L 67/2852* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 6,434,608 B1* | 8/2002 | Desai | 709/217 |
| 6,859,849 B2* | 2/2005 | Liang | 710/35 |
| 7,236,786 B2* | 6/2007 | Shen et al. | 455/436 |
| 8,949,533 B2* | 2/2015 | Puthalath et al. | 711/119 |
| 2007/0136757 A1 | 6/2007 | Cormack et al. | |
| 2009/0119455 A1* | 5/2009 | Kisel | H04L 67/104 711/118 |
| 2009/0144167 A1 | 6/2009 | Calamera | |
| 2009/0285209 A1 | 11/2009 | Stewart et al. | |

(Continued)

FOREIGN PATENT DOCUMENTS

| | | |
|---|---|---|
| JP | 2009-278624 A | 11/2009 |
| KR | 10-2012-0038187 A | 4/2012 |

OTHER PUBLICATIONS

Ioannis Psaras, Wei Koong Chai, George Pavlou, Proceeding ICN' 12 Proceedings of the second edition of the ICN workshop on Information-centric networking, pp. 55-60, Aug. 13-17, 2012.*

(Continued)

*Primary Examiner* — Umar Cheema
*Assistant Examiner* — John Fan
(74) *Attorney, Agent, or Firm* — NSIP Law

(57) ABSTRACT

A method of transmitting a content reply packet from a content owner in content-centric networking (CCN) includes determining a caching capability value threshold (CCVth) for determining a candidate node for caching a content based on a policy of the content owner, and transmitting a content reply packet including the content and the CCVth in response to a content request packet from a content requester.

25 Claims, 13 Drawing Sheets

(56) References Cited

U.S. PATENT DOCUMENTS

| | | | |
|---|---|---|---|
| 2009/0287835 A1* | 11/2009 | Jacobson | H04L 67/104 709/229 |
| 2011/0040893 A1* | 2/2011 | Karaoguz et al. | 709/242 |
| 2011/0161355 A1* | 6/2011 | Lee et al. | 707/769 |
| 2011/0280214 A1 | 11/2011 | Lee et al. | |
| 2012/0030297 A1 | 2/2012 | Levett | |
| 2012/0158912 A1 | 6/2012 | Jacobson | |
| 2012/0158973 A1 | 6/2012 | Jacobson et al. | |

OTHER PUBLICATIONS

J. Challenger, A. Iyengar and P. Dantzig, "A scalable system for consistently caching dynamic Web data," INFOCOM '99. Eighteenth Annual Joint Conference of the IEEE Computer and Communications Societies. Proceedings. IEEE, New York, NY, 1999, pp. 294-303 vol. 1.*

International Search Report Issued Mar. 4, 2014 in counterpart International Application No. PCT/KR2013/010757. (3 pages in English).

Choi, Nakjung, et al. "In-Network Caching Effect on Optimal Consumption in Content-Centric Networking." *2012 IEEE International Conference on Communications (ICC)*. IEEE, 2012. (6 pages, in English).

Chai, Wei Koong, et al. "Cache "Less for More" In Information-Centric Networks." *International Conference on Research in Networking*. Springer Berlin Heidelberg, 2012. (14 pages, in English).

Cho, Kideok, et al. "WAVE: Popularity-Based and Collaborative In-Network Caching for Content-Oriented Networks." *Computer Communications Workshops (INFOCOM WKSHPS), 2012 IEEE Conference on*. IEEE, 2012 (6 pages, in English).

Psaras, Ioannis, et al. "Probabilistic In-Network Caching for Information-Centric Networks." *Proceedings of the Second Edition of the ICN Workshop on Information-Centric Networking*. ACM, 2012. (6 pages, in English).

Ming, Zhongxing, et al. "Age-Based Cooperative Caching in Information-Centric Networking." *2014 23rd International Conference on Computer Communication and Networks (ICCCN)*. IEEE, 2014. (6 pages, in English).

European Extended Search Report issued on Jun. 2, 2016 in counterpart European Patent Application No. 13857507.1 (11 pages, in English).

\* cited by examiner

METHOD OF PACKET TRANSMISSION FROM NODE AND CONTENT OWNER IN CONTENT-CENTRIC NETWORKING

CROSS-REFERENCE TO RELATED APPLICATIONS

This application claims the benefit under 35 USC 119(a) of Korean Patent Application Nos. 10-2012-0134452 filed on Nov. 26, 2012, and 10-2013-0030394 filed on Mar. 21, 2013, in the Korean Intellectual Property Office, the entire disclosures of which are incorporated herein by reference for all purposes.

BACKGROUND

1. Field

This application relates to methods of packet transmission from a node and a content owner in content-centric networking (CCN).

2. Description of Related Art

Content-centric networking (CCN) focuses on data rather than a location from which the data is to be retrieved, and thus specifies a name of a necessary content in a header of a packet, in contrast to Internet Protocol (IP)-based networking where source and destination addresses are described in a header of a packet. Each router sets up a routing table, and using the routing table, a packet is forwarded to a location in which a content is present by referring to a header of the packet indicating a name of the content. In addition to the router, all network devices have a storage for storing contents for a short time. In CCN, a packet is classified into a content request packet and a content reply packet. The content request packet includes a name of a necessary content, and the content reply packet includes the requested content and the name of the requested content. When a content request packet is transmitted to a network device, the network device checks its storage for a corresponding content by a name of the content included in a header of the packet, and when the corresponding content is present in the storage, sends a reply to the request by transmitting the content to a requester. In CCN, a node in which the requested content is present in a storage may send a reply to the request even though the node is an intermediate node. Accordingly, an average transmission path length is shortened while eliminating a need for a content to be retrieved from an original content owner, resulting in a reduction of a total amount of network usage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of transmitting a content reply packet from a content owner in content-centric networking (CCN) includes determining a caching capability value threshold (CCVth) for determining a candidate node for caching a content based on a policy of the content owner; and transmitting a content reply packet including the content and the CCVth in response to a content request packet from a content requester.

The policy of the content owner may be based on any one or any combination of a name of the content, a popularity of the content, an importance of the content, and a hit ratio of the content.

The method may further include adjusting the CCVth in response to a change of the policy of the content owner.

The CCVth may be used to determine a location of a candidate node for caching the content and a number of candidate nodes for caching the content.

All nodes may cache the content in response to the CCVth having a first value; no nodes may cache the content in response to the CCVth having a second value; and a node having a caching capability value (CCV) greater than a third value may cache the content in response to the CCVth having the third value.

The method may further include adjusting a lifetime of the content included in the content reply packet based on the policy of the content owner.

The content reply packet further may include any one or any combination of an original network distance value (oNDV) between the candidate node and the content owner included in the content request packet, a decreasing network distance value (dNDV) that decreases with downstream forwarding of the content reply packet, a maximum CCV included in the content request packet, a weight value, and a lifetime of the content.

In another general aspect, a non-transitory computer-readable storage medium stores a program for controlling a computer to perform the method described above.

In another general aspect, a method of transmitting a content request packet from a node in content-centric networking (CCN) includes calculating a caching capability value (CCV) for identifying a candidate node for caching a content based on node-related information of the node; comparing the calculated CCV to a CCV included in a content request packet to be forwarded by the node; and determining whether the node is a candidate node for caching the content based on a result of the comparing.

The node-related information may include any one or any combination of a cache size of the node, a popularity of the content requested from the node, a network centrality or a node connectivity of the node, a bandwidth of the node, and a name of the content.

The content request packet may include a name of the content, and caching-related information including a CCV of a candidate node and a network distance value (NDV) between a content owner and the candidate node.

The determining of whether the node is a candidate node for caching the content based on the result of the comparing may include, in response to the calculated CCV being greater than the CCV included in the content request packet to be forwarded by the node, updating the CCV included in the content request packet to the calculated CCV; and initializing a network distance value (NDV) between a content owner and a candidate node included in the content request packet.

The determining of whether the node is a candidate node for caching the content based on the result of the comparing may include, in response to the calculated CCV being less than or equal to the CCV included in the content request packet to be forwarded by the node, maintaining the CCV included in the content request packet; and increasing a network distance value (NDV) between a content owner and a candidate node included in the content request packet.

A content reply packet transmitted in response to the content request packet may include any one or any combination of the content, an original network distance value (oNDV) between a content owner and a candidate node included in the content request packet, a decreasing network distance value (dNDV) that decreases with downstream forwarding of the content reply packet, a CCVth, a maximum CCV included in the content request packet, a weight value, and a lifetime of the content.

The method may further include forwarding the content reply packet downstream based on the dNDV.

The method may further include decreasing the dNDV included in the content reply packet as the content reply packet is forwarded downstream.

The method may further include recognizing whether the node or a neighboring node of the node is to cache the content based on the dNDV.

The method may further include caching the content in the node based on results of comparing the oNDV to the dNDV and comparing the calculated CCV to the CCVth.

The method may further include maintaining a timer in a forwarding interest base (FIB) table of an outbound neighboring node of the node, the timer being set based on the lifetime of the content cached in the node.

The method may further include adjusting the lifetime of the cached content using a least recently used (LRU) algorithm or a least frequently used (LFU) algorithm.

The method may further include deleting the cached content in response to the lifetime of the cached content expiring or in response to the content request packet for the cached content being received through a face different from a face stored in forwarding interest base (FIB) table of the node.

The method may further include determining whether the node is a candidate node for caching the content using the weight value in response to the content reply packet including the weight value for the CCV.

The determining of whether the node is a candidate node for caching the content using the weight value may include calculating a CCVth using the maximum CCV included in the content request packet and the weight value; and determining whether the node is a candidate node for caching the content using the calculated CCVth.

The determining of whether the node is a candidate node for caching the content using the calculated CCVth may include comparing the calculated CCVth to the calculated CCV; and determining whether the node is a candidate node for caching the content based on a result of the comparing of the calculated CCVth to the calculated CCV.

The determining of whether the node is a candidate node for caching the content may include determining the node to be a candidate node for caching the content in response to the calculated CCV being greater than the calculated CCVth.

The method may further include storing the weight value in the node.

The method may further include forwarding the stored weight value to a next node.

In another general aspect, a method of caching content in an intermediate node in content-centric networking (CCN) includes identifying an intermediate node between a content requester and a content owner in which a content requested by the content requester is to be cached based on node-related information of the intermediate node and information included in a content reply packet including the content transmitted from the content owner in response to a content request packet transmitted from the content requester to the content owner via the intermediate node; and caching the content included in the content reply packet in the identified intermediate node in which the content is to be cached.

The identifying may include receiving the content reply packet in an intermediate node; identifying the intermediate node as an intermediate node in which the content requested by the content requester is to be cached in response to a caching capability value (CCV) of the intermediate node being greater than or equal to a caching capability value threshold (CCVth) included in the content reply packet; and identifying the intermediate node as not being an intermediate node in which the content requested by the requester is to be cached in response to the CCV being less than the caching CCVth.

The method may further include calculating the CCVth based on a maximum CCV included in the content reply packet and a weight value included in the content reply packet; wherein the maximum CCV is a maximum CCV among all intermediate nodes in a transmission path along which the content request packet was transmitted from the content requester to the content owner.

The identifying may include receiving the content reply packet in an intermediate node; identifying the intermediate node as an intermediate node in which the content requested by the content requester is to be cached in response to a caching capability value (CCV) of the intermediate node being greater than or equal to a caching capability value threshold (CCVth) included in the content reply packet and a decreasing network distance value (dNDV) included in the content reply packet being equal to zero, the dNDV having a value that decreases with downstream forwarding of the content reply packet; and identifying the intermediate node as not being an intermediate node in which the content requested by the requester is to be cached in response to the CCV being less than the caching CCVth or the dNDV not being equal to zero.

Other features and aspects will be apparent from the following detailed description, the drawings, and the claims.

DETAILED DESCRIPTION

Figure 1:
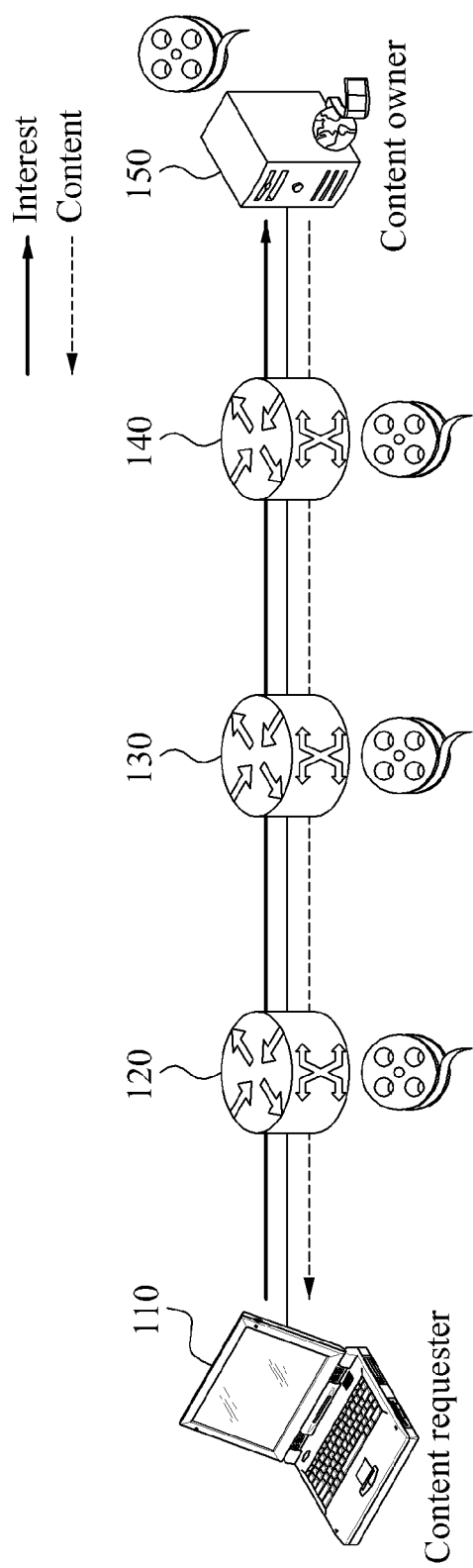
FIG. 1 is a diagram illustrating an example of content request and reply in content-centric networking (CCN) in the related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a diagram illustrating an example of content request and reply in content-centric networking (CCN) in the related art.

As used hereinafter, the term "node" may be understood to include a network device, such as, for example, a mobile terminal and a router. The term "content owner" may refer to a node that owns a content requested from a "content requester" originally, and the term "content requester" may refer to a node that requests a content. The term "intermediate node" may refer to any other node that is not the content owner and the content requester in CCN. However, in various examples, the content owner and the content requester may be used as an intermediate node.

Referring to FIG. 1, a content requester 110 transmits a content request packet called an "interest" over a network, and a content owner 150 receiving the content request packet transmits a content reply packet called a "content" in response to the content request packet. A content included in the content reply packet may be cached in intermediate nodes 120, 130, and 140 on a path, as well as in the content owner 150.

When the content owner 150 transmits the content reply packet in response to the content request packet received by the content owner 150, the intermediate nodes 120, 130, and 140 forward the content reply packet to a location from which the content request packet was received, for example, a face. The intermediate nodes 120, 130, and 140 may cache the content included in the content reply packet in a storage, for example, a content store (CS) 210 of FIG. 2, for a short time, as well as transmitting the content. All of the intermediate nodes 120, 130, and 140 on the transmission path may cache the same content.

When the content owner 150 caches a variety of contents and a plurality of content requesters transmit content request packets, the intermediate nodes 120, 130, and 140 on the network path may cache a variety of the contents. When a plurality of content requesters request a variety of contents, a large amount of contents may be cached in each of the intermediate nodes 120, 130, and 140, and new content may be cached preferentially. For example, if the CS 210 of one of the intermediate nodes 120, 130, and 140 is full when the intermediate node receives a new content reply packet, the intermediate node may delete an older content cached in the CS 210 and cache the new content included in the new content reply packet in the CS 210.

Figure 2:
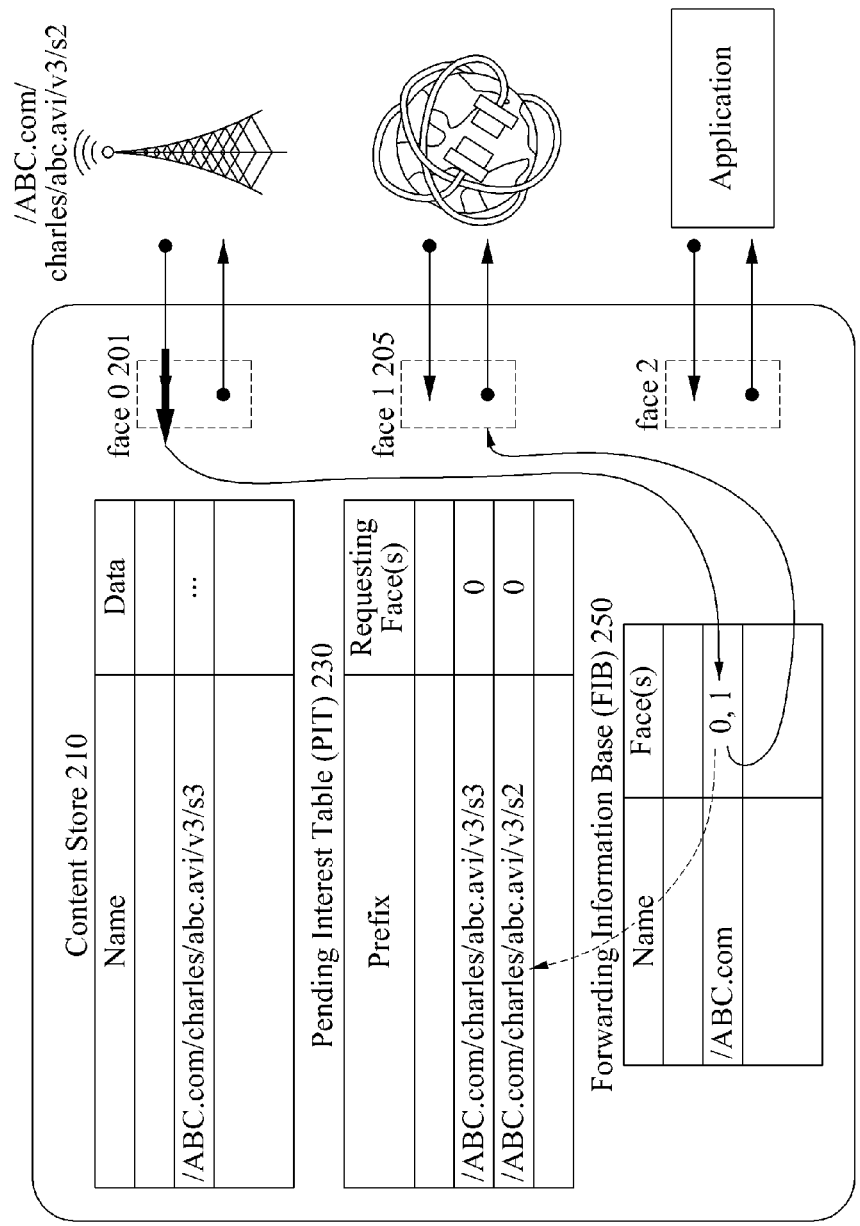
FIG. 2 is a diagram illustrating an example of processing of a content request packet in CCN of FIG. 1.

FIG. 2 is a diagram illustrating an example of processing of the content request packet in CCN of FIG. 1.

In CCN, also known as name-based networking or named data networking, a name of a content may perform a compass function to locate a node in which the content is cached, and may be used to identify the content. Accordingly, each content uses a unique name. Two contents having different names may be recognized to be different contents even though the contents of the two contents are identical.

For example, when the contents of two files are identical but have different content names of "/ABC.com/sait/video/intro.avi" and "/ABC.com/sait/comm/video/intro.avi", the contents of the files may be recognized to be different even thought they are identical. The preceding rule may be useful for distinguishing different contents having similar content names.

Referring to FIG. 2, an example of processing of a content request packet to retrieve a corresponding content based on a hierarchical name of the content in CCN is described.

When a CCN node receives a content request packet for a content named "/ABC.com/charles/abc.avi/v3/s2" from a face 0 201, a networking module of the node determines whether the corresponding content is present in the CS 210 by referring to the hierarchical name of the content, "/ABC.com/charles/abc.avi/v3/s2", included in the content request packet.

When the corresponding content is determined to be present in the CS 210, the node transmits the corresponding content to the face 0 201 from which the content request packet was received. The face may be also be referred to as an interface.

The node determines whether an entry stored with the same content name "/ABC.com/charles/abc.avi/v3/s2" is present in a pending interest table (PIT) 230 when the corresponding content is determined to be absent in the CS 210.

When the entry stored with the same content name is present in the PIT 230, the node adds information associated with the face from which the content request packet was received, in this case, the face 0 201, to the corresponding entry in the PIT 230.

When the entry stored with the same content name is absent in the PIT 230, the node looks up the corresponding entry in a forwarding information base (FIB) 250 based on the content name. The node may use longest prefix matching when conducting a search.

The node determines a face to which the content request packet is to be forwarded, in this case, a face 1 205, based on information registered in the FIB 250, and forwards the content request packet to the determined face 1 205.

The node registers, in the PIT 230, the information 0 associated with the face 0 201 from which the content request packet was received. The registration enables the node to forward a content reply packet including a content corresponding to the content request packet to a node requesting the corresponding content when the content reply packet is received. The face from which the content request packet was received, in this case, the face 0 201, may be excluded when determining a face to which the content request packet is to be forwarded based on the FIB 250.

Figure 3A:
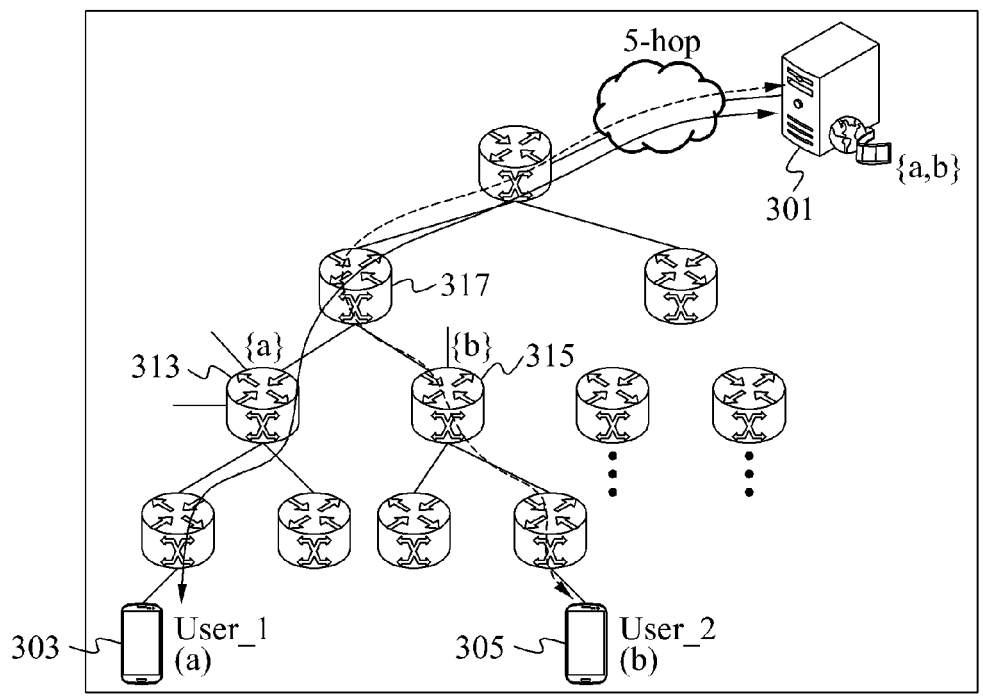
FIGS. 3A and 3B are diagrams illustrating examples of a reply to a content request in CCN.
Figure 3B:
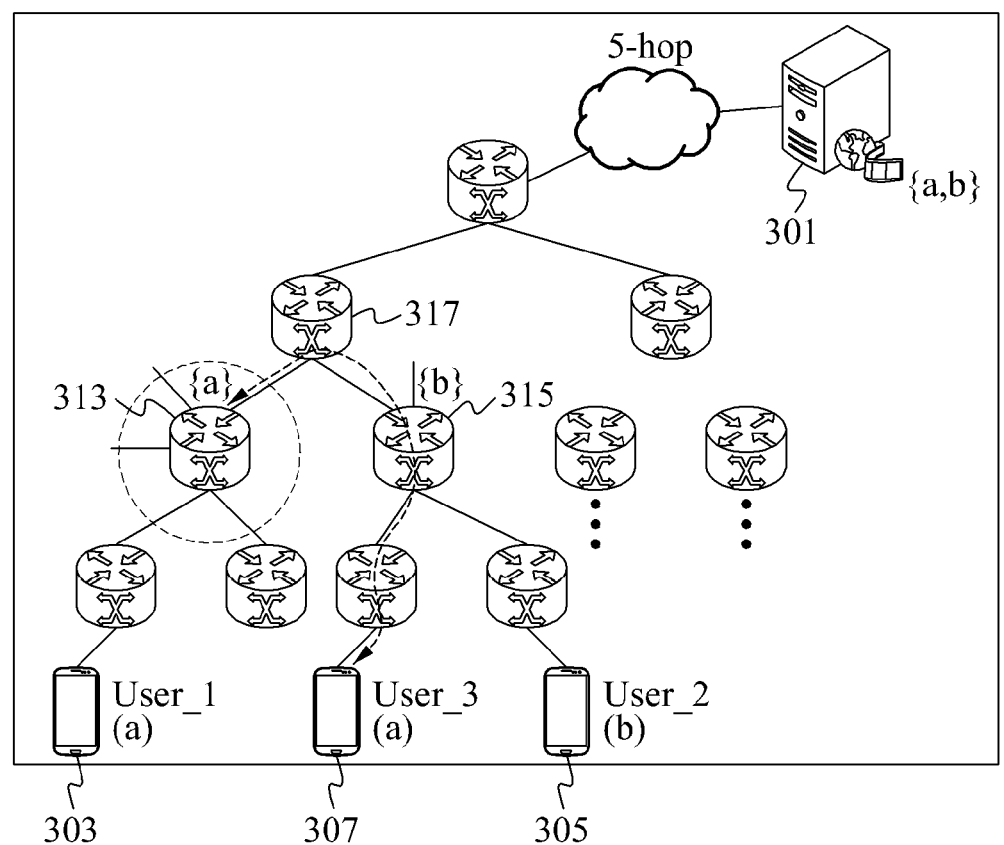

FIGS. 3A and 3B are diagrams illustrating examples of a reply to a content request in CCN.

In one example, in CCN, a content may be stored or cached in a node corresponding to an optimum location, rather than in all intermediate nodes on a transmission path.

A neighboring node of the node in which the content is stored or cached may store information associated with the node corresponding to the optimum location and a list of contents stored or cached in the node corresponding to the optimum location to promote efficient content routing.

The content may be cached in the node corresponding to an optimum location based on a state of the node including a size of a CS of the node, a frequency of a request, and a network centrality or a node connectivity of the node. The neighboring node may recognize the node in which the content is cached and may support the content routing based on the recognition to maximize the utility of network caching resources.

As such, distributed content storage and content caching node recognition may reduce an amount of network usage and may provide a quick response to a request from a user.

Referring to FIG. 3A, when a content owner 301 owns a content 'a' and a content 'b' and a user 1 303 requests the content 'a' and a user 2 requests the content 'b', the content 'a' may be cached in a node 313 determined to be optimal and the content 'b' may be cached in a node 315 determined to be optimal. An outbound neighboring node 317 of the node 313 and the node 315 may store locations of the nodes 313 and 315, and names of the contents 'a' and 'b' or a list of contents cached in the nodes 313 and 315.

Referring to FIG. 3B, subsequent to a user 3 307 requesting the content 'a', the neighboring node 317 may re-route the request for the content 'a' to the node 313 in which the content 'a' is also cached. The neighboring node 317 on the transmission path may be aware of a location of a node in which the content 'a' is cached and a name of a content cached in the node because the content 'a' is also cached in the node 313.

Accordingly, the neighboring node 317 may re-route the request for the content 'a' from the user 3 307 to the node 313 so that the node 313 can transmit the content 'a' to the user 3 307.

Hereinafter, a method of finding a node determined to be optimal to cache a content and a method of recognizing the content by a neighboring node is described in further detail.

Figure 4:
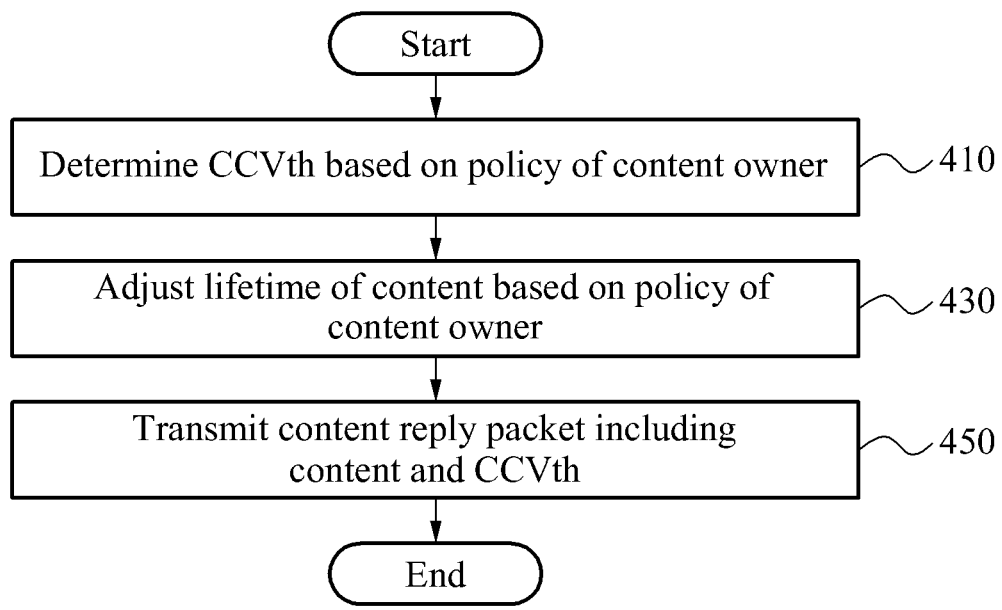
FIG. 4 is a flowchart illustrating an example of a method of transmitting a content reply packet from a content owner in CCN.

FIG. 4 is a flowchart illustrating an example of a method of transmitting a content reply packet from a content owner in CCN.

To find a node determined to be optimal for caching a content, a caching capability value (CCV) and a caching capability value threshold (CCVth) may be defined.

The CCV of a node may be understood to be a capability of the node to cache a content based on node-related information of the node. The CCV may be used to identify a candidate node for caching a content.

The CCVth may be understood to be a lower bound for determining whether to cache a content in a node. A node having a CCV greater than a CCVth may cache a content. As an example, the CCVth may be determined by a content owner based on a policy of the content owner, or may be determined by each intermediate node using a weight value and a maximum CCV transmitted in a content reply packet from the content owner.

In FIG. 4, a description of a case in which a CCVth is determined based on a policy of a content owner is provided.

Referring to FIG. 4, in 410, a content owner determines a CCVth for determining a candidate node for caching a content based on a policy of the content owner.

The policy of the content owner may be determined based on any one or any combination of a name of the content, a popularity of the content, an importance of the content, and a hit ratio of the content.

The name of the content may be a community name, a local name, or a prefix, rather than a full name.

Taking a popular content as an example, the content owner may adjust the CCVth of the content based on a popularity of the content to allow the content to be cached in a larger number of nodes, and vice versa. In this example, the CCVth may be adjusted in response to a change in the policy of the content owner.

In 430, the content owner adjusts a lifetime of the content included in a content reply packet based on the policy of the content owner.

In 450, the content owner transmits the content reply packet including the content and the CCVth in response to a content request packet received from a content requester. The content reply packet may include any one or any combination of an original network distance value (oNDV) between a candidate node and the content owner included in the content request packet, a decreasing network distance value (dNDV) that decreases with downstream forwarding of the content reply packet, a maximum CCV included in the content request packet, a weight value, and a lifetime of the content.

Figure 5:
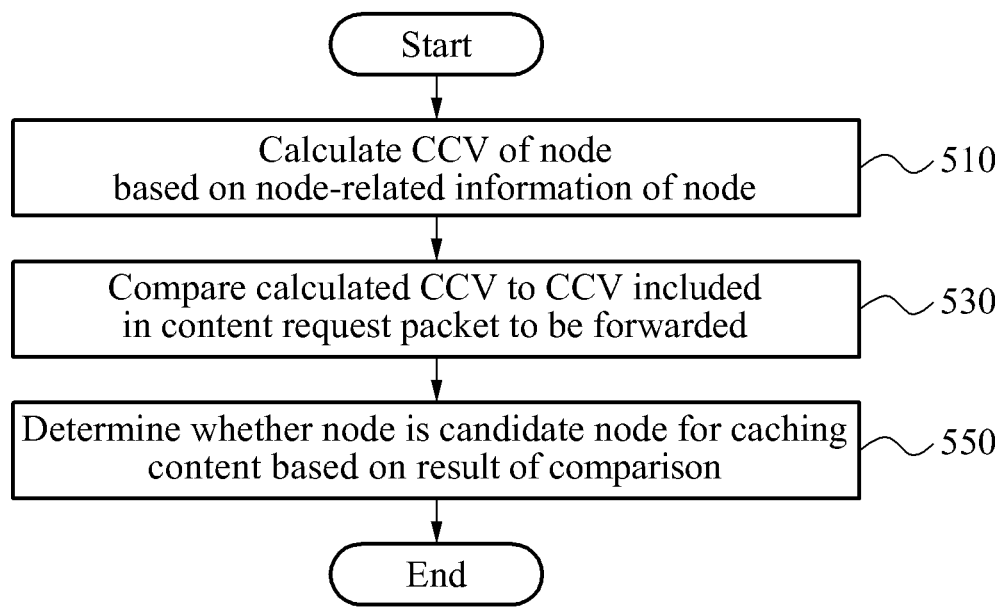
FIG. 5 is a flowchart illustrating an example of a method of transmitting a content request packet from a node in CCN.

FIG. 5 is a flowchart illustrating an example of a method of transmitting a content request packet from a node in CCN.

Referring to FIG. 5, in 510, a node calculates a CCV for identifying a candidate node for caching a content based on node-related information of the node. The node-related information may include any one or any combination of a cache size of the node, a popularity of the content requested from the node, a network centrality or a node connectivity of the node, a bandwidth of the node, and a name of the content.

In 530, the node compares the calculated CCV to a CCV included in a content request packet to be forwarded received from another node. The content request packet may include the name of the content, and caching-related information including the CCV of a candidate node and a network distance value (NDV) between the candidate node and the content owner.

In 550, the node determines whether the node is a candidate node for caching the content based on a result of the comparison. When the calculated CCV is found to be greater than the CCV included in the content request packet as a result of the comparison, the node determines the node to be a candidate node by updating the CCV included in the content request packet to the calculated CCV of the node. After passing through each node between a content requester and the content owner, the content request packet will include a final updated CCV, that is, a maximum CCV among CCVs of each node. The content owner may determine a candidate node for caching the content based on a result of comparing the calculated CCVth to the CCV included in the content request packet. The NDV between the candidate node and the content owner in the content request packet may be used to find a node in which the content is to be cached.

Hereinafter, a method of determining the candidate node for caching the content through transmission of the content request packet is described in further detail with reference to FIG. 6.

Figure 6:
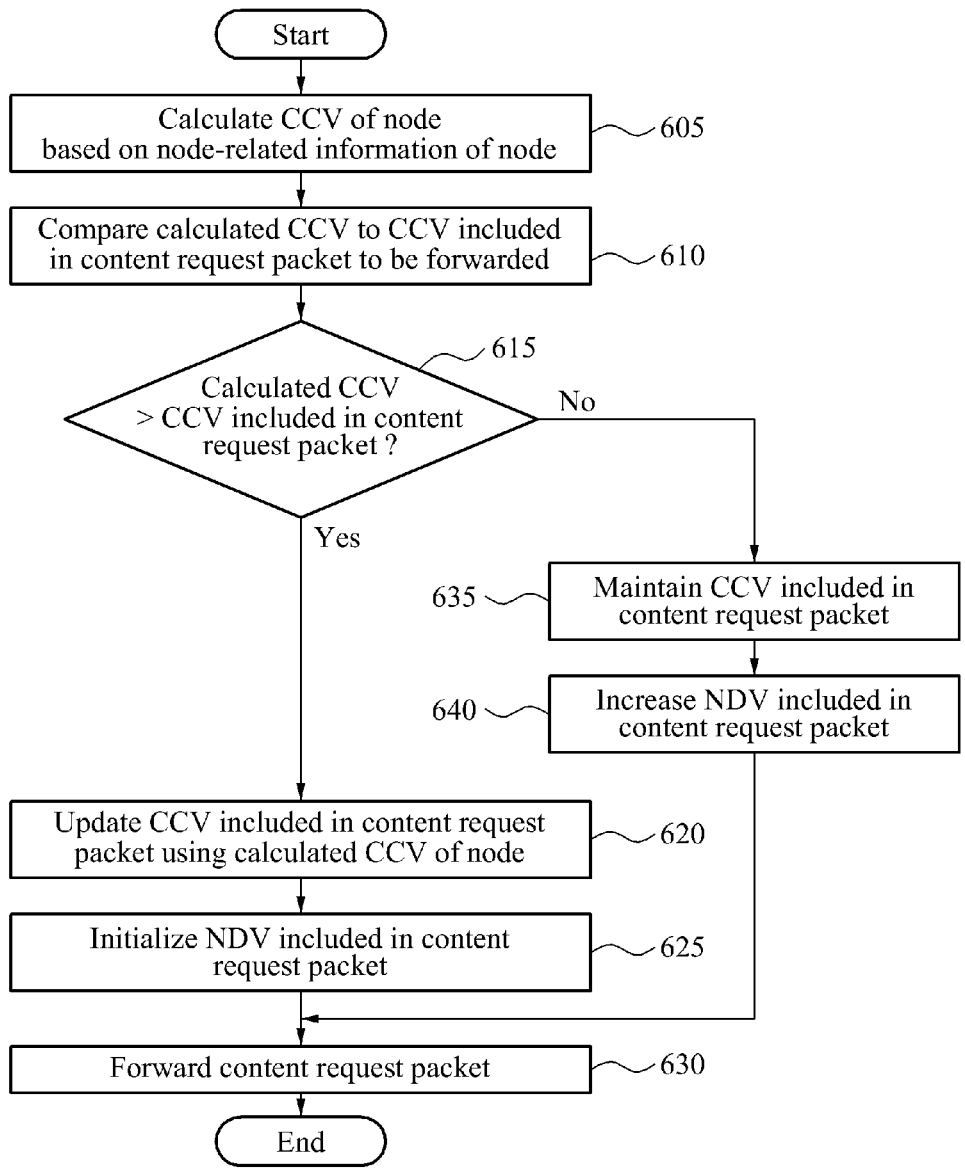
FIG. 6 is a flowchart illustrating another example of a method of transmitting a content request packet from a node in CCN.

FIG. 6 is a flowchart illustrating another example of a method of transmitting a content request packet from a node in CCN.

Referring to FIG. 6, in 605, a node calculates a CCV for identifying a candidate node for caching a content based on node-related information of the node. The node-related information may include any one or any combination of a cache size of the node, a popularity of the content requested from the node, a network centrality or a node connectivity of the node, a bandwidth of the node, and a name of the content.

In 610, the node compares the calculated CCV calculated in 605 to a CCV included in a content request packet to be forwarded received from another node. The content request packet may include the name of the content, and caching-related information including the CCV of the a candidate node and an NDV between the candidate node and the content owner.

In 615, the node determines whether the calculated CCV is greater than the CCV included in the content request packet to be forwarded.

In 620, when the calculated CCV is found to be greater than the CCV included in the content request packet as a result of the comparison, the node updates the CCV included in the content request packet to the calculated CCV. By updating the CCV, the node determines that it is a candidate node for caching the content, and a final updated CCV will be a maximum CCV among CCVs of each node through which the content request packet passes as described above with respect to FIG. 5.

In 625, the node may initializes the NDV between the candidate node and the content owner in the content request packet to a null value '0'.

The NDV may be used by the content owner to find a candidate node for caching the content in response to the content request packet being received by the content owner. The NDV between the candidate node and the content owner may be indicated by a hop count, for example.

In 630, the node forwards the content request packet.

When the calculated CCV is less than or equal to the CCV included in the content request packet to be forwarded, the node maintains the CCV included in the content request packet in 635, and increases the NDV between the candidate node and the content owner in the content request packet in 640.

Through the foregoing process, the content request packet being transmitted to the content owner will include a final updated CCV, that is, a maximum CCV among CCVs of nodes on a transmission path of the content request packet.

Figure 8:
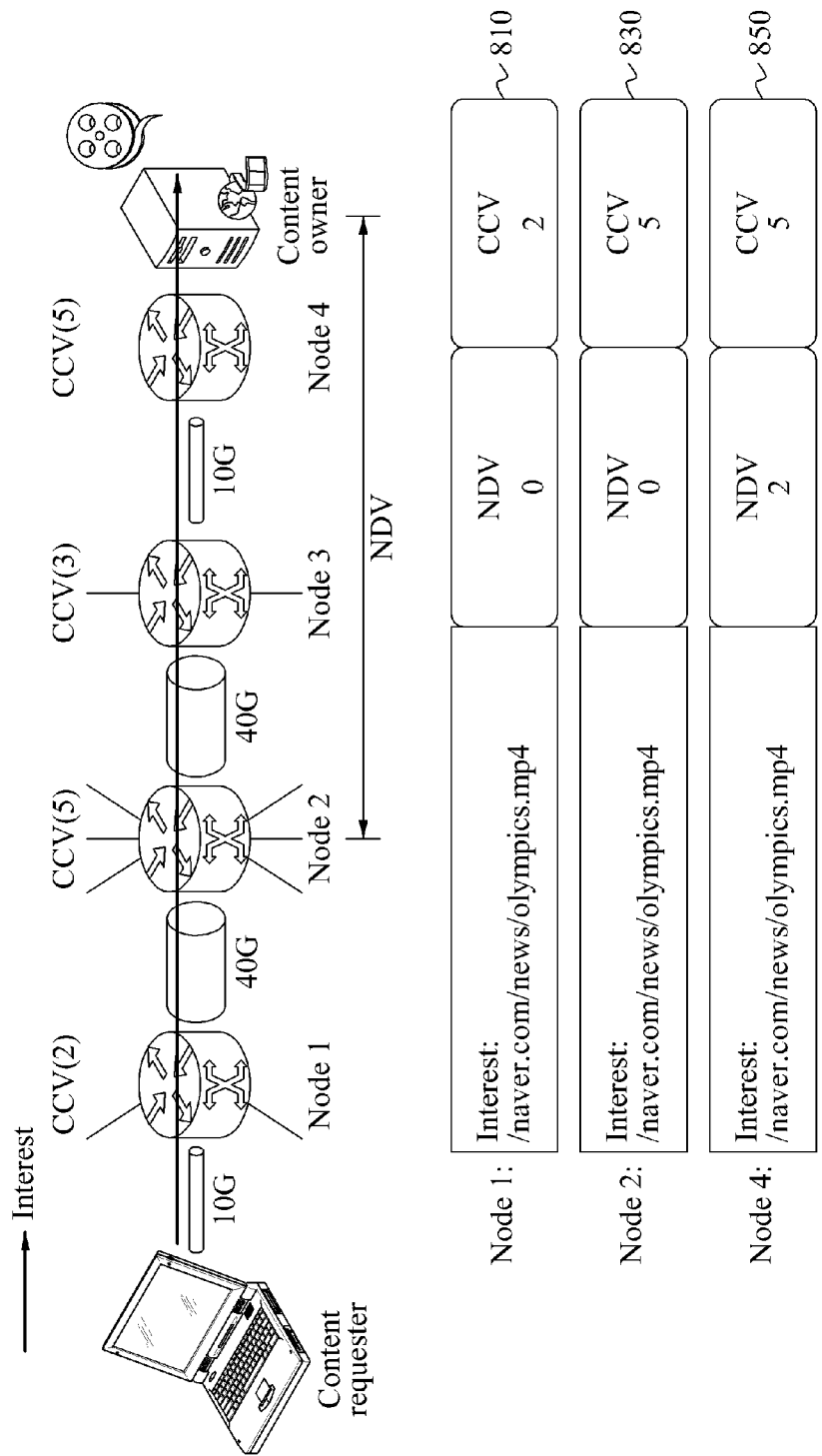
FIG. 8 is a diagram illustrating an example of a method of determining a candidate node for caching a content using a content request packet in CCN.

A further detailed description of the method of FIG. 6 is provided with reference to FIG. 8.

Figure 7:
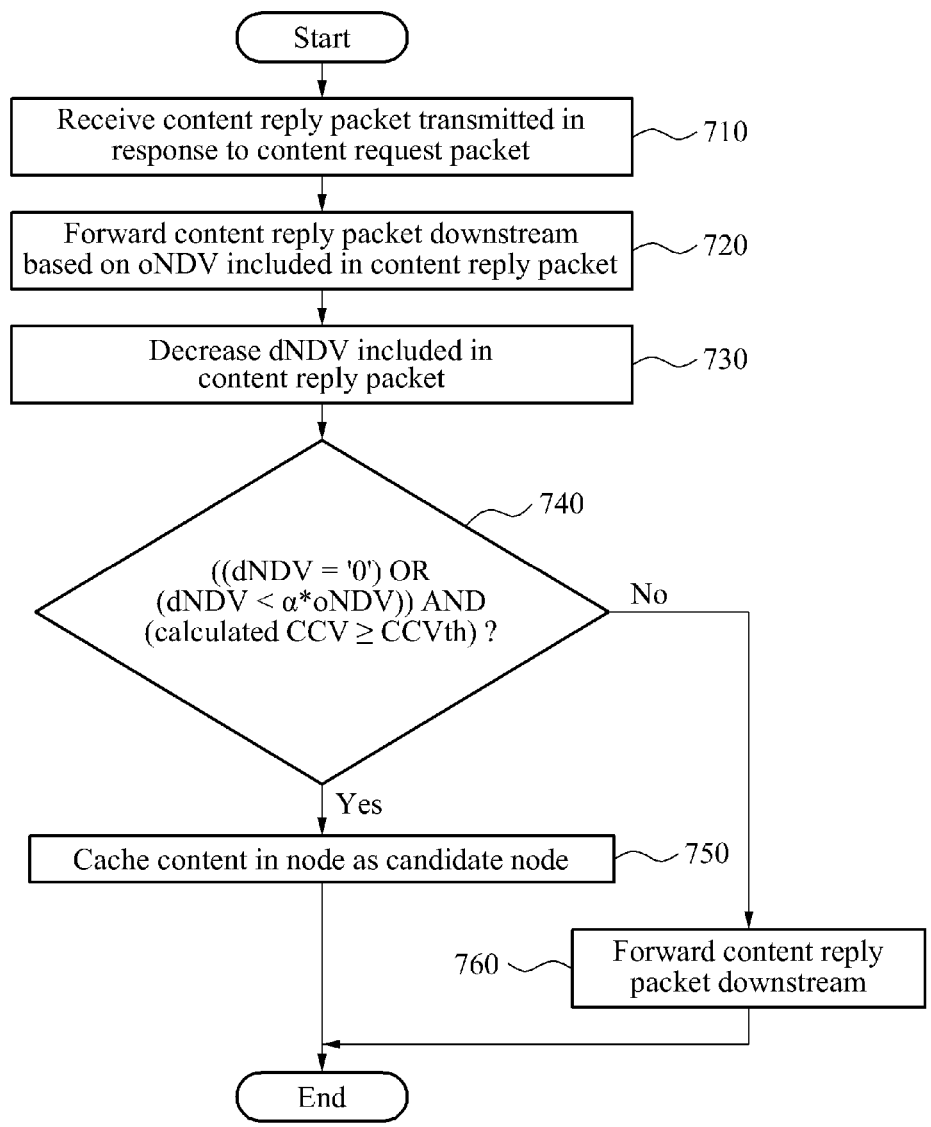
FIG. 7 is a flowchart illustrating an example of a method of transmitting a content reply packet from a node in CCN.

FIG. 7 is a flowchart illustrating an example of a method of transmitting a content reply packet from a node in CCN.

Referring to FIG. 7, in CCN, each node may transmit a content reply packet in response to a content request packet, and may cache a content included in the content reply packet if the node is a candidate node.

In 710, a node receives a content reply packet transmitted by a content owner in response to the content request packet containing a maximum CCV transmitted by the node to the content owner through the process of FIG. 6.

As an example, the content reply packet may include any one or any combination of the content, an oNDV between the candidate node and the content owner included in the content request packet, a dNDV that decreases with downstream forwarding of the content reply packet, a CCVth, a maximum CCV included in the content request packet, a weight value, and a lifetime of the content.

In 720, the node forwards the content reply packet downstream based on the oNDV included in the content reply packet.

In 730, the node decreases the dNDV included in the content reply packet.

Results of comparing the oNDV to the dNDV and comparing a CCV of the node to the CCVth may be used to determine whether to cache the content in the node.

In 740, the node determines whether the dNDV is '0' or the dNDV<α*oNDV, and whether the CCV of the node is greater than or equal to the CCVth. 'α' may be determined based on a policy of the content owner or a popularity of the content, and may have a value of 0.5, for example.

A dNDV of '0' indicates that the content has arrived at a candidate node to which the content is to be transmitted though the content request packet. A dNDV<α*oNDV, for example, a dNDV<0.5*oNDV, indicates that the node is closer to a node requesting the content than to the content owner. A CCV of the node that is greater than or equal to the CCVth indicates that the content may be cached in the node based on the policy of the content owner.

In 750, when the conditions are satisfied in 740, the node caches the content in the node as a candidate node, for example, in a CS of the node.

In 760, when the conditions are not satisfied in 740, the node forwards the content reply packet downstream.

Figure 9:
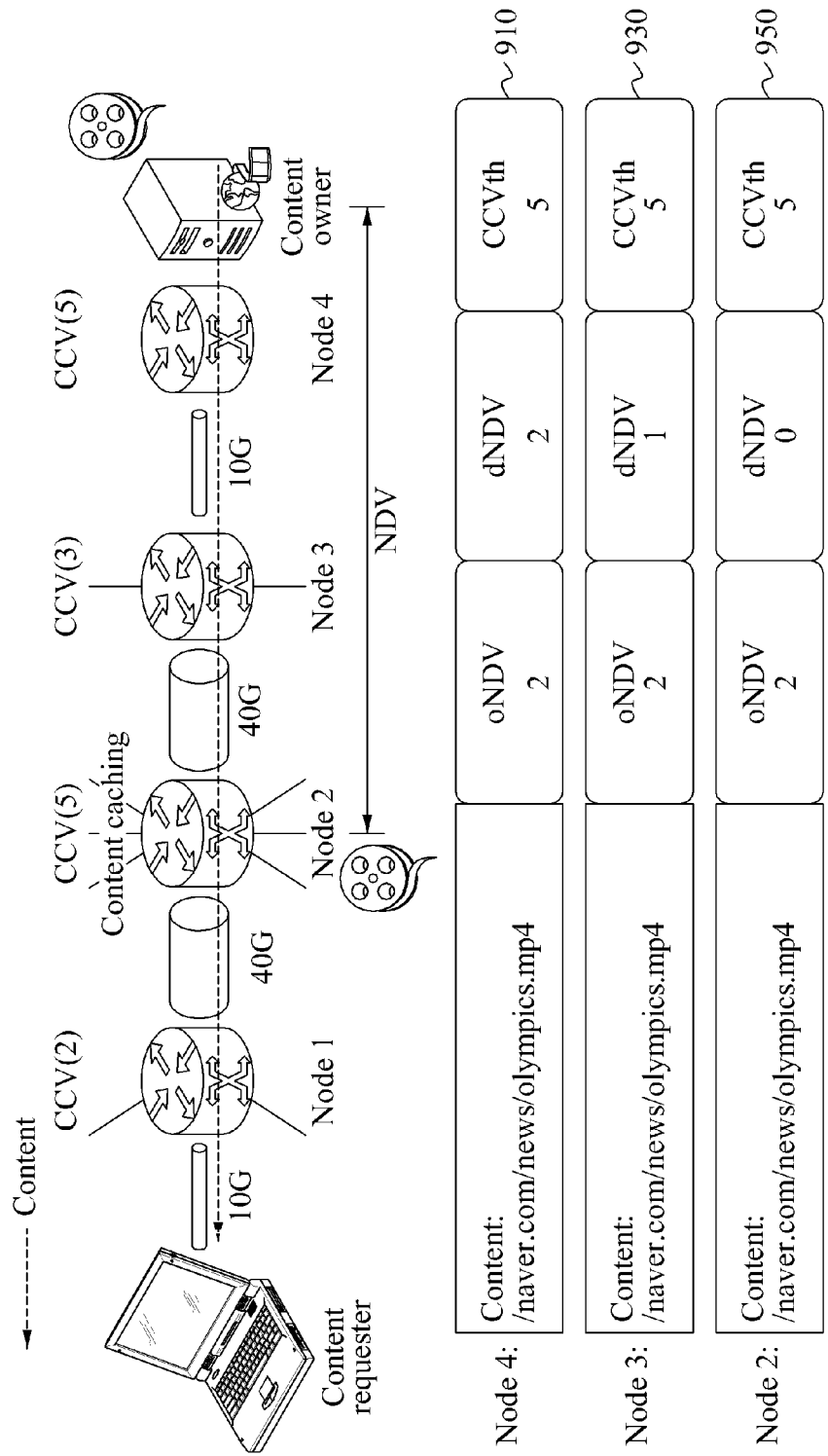
FIG. 9 is a diagram illustrating an example of a method of determining a candidate node for caching a content using a content reply packet in CCN.

A further detailed description of the method of FIG. 7 is provided with reference to FIG. 9.

FIG. 8 is a diagram illustrating an example a method of determining a candidate node for caching a content using a content request packet in CCN.

Hereinafter, a node 1 may be a node serving a content requester, and a node 4 may be a node serving a content owner. The content requester may request a content, for example, a file "/naver.com/news/olympics.mp4".

When the node 1 has a CCV of '2', a node 2 has a CCV of '5', a node 3 has a CCV of '3', and the node 4 has a CCV of '5', a node having a greatest CCV may be determined to be a candidate node for caching a content. The CCV may be calculated based on a state of a node, i.e., based on node-related information of the node.

A CCV f may be determined based on node-related information of a node according to the following Equation 1.

$$f = w_1 \cdot C_{size} + w_2 \cdot BW + w_3 \cdot C + w_4 \cdot CP + \ldots \quad (1)$$

In Equation 1, $C_{size}$ denotes an available cache size of the node, BW denotes a bandwidth of the node, C denotes a network centrality of the node or a node connectivity of the node, CP denotes a popularity of the content requested from the corresponding node, and $w_1$, $w_2$, $w_3$, and $w_4$ denote weight values.

The content requester transmits to the node 1 a content request packet including a content name containing a content name, for example, "/naver.com/news/olympics.mp4", an NDV field to contain an NDV between a candidate node and the content owner, and a CCV field to contain a maximum CCV among CCVs of nodes on a transmission path of the content request packet. The content requester initializes the NDV field and the CCV field to a null value '0'.

The node 1 forwards to the node 2 a content request packet 810 including the name of the content, for example, "/naver.com/news/olympics.mp4", the NDV between the candidate node and the content owner, and the CCV of the node 1, for example, '2'. The node 1 initializes the NDV between the candidate node and the content owner to a null value '0'.

The node 2 receives the content request packet 810 from the node 1, and compares the CCV included in the content request packet 810 to the CCV of the node 2.

To cache the content in a node having a greatest CCV, a node receiving the content request packet records the CCV of the node in place of the CCV included in the content request packet 810 when the CCV of the node is greater than the CCV included in the content request packet.

Accordingly, the node 2 overwrites the CCV '5' of the node 2 over the CCV '2' included in the content request packet 810 received by the node 2 in a content request packet 830. Since the node 2 has overwritten the CCV, the node 2 also initializes the NDV to a null value '0'.

The content request packet 830 is forwarded from the node 2 to the node 3.

Since the CCV '3' of the node 3 is smaller than the CCV '5' included in the content request packet 830, the node 3 maintains the CCV '5' included in the content request packet 830, and increases the NDV to '1' in a content request packet forwarded to the node 4 (not shown in FIG. 8).

The node 4 receives the content request packet from the node 3, and compares the CCV '5' included in the content request packet to the CCV '5' of the node 4.

Since the CCV '5' of the node 4 is not greater than the CCV '5' included in the content request packet received from the node 3 because the CCV '5' of the node 4 equals the CCV '5' included in the content request packet received from the node 3, the node 4 maintains the CCV '5' included in the content request packet and increases the NDV to '2' in a content request packet 850 forwarded to the content owner.

The operation described in the foregoing may be coded as follows, wherein "Interest" denotes the content request packet and "Router" denotes the node:

```
If (CCV in received Interest < Router's CCV)
{
  update CCV in received Interest with Router's CCV;
  NDV == 0;
}
If (CCV in received Interest >= Router's CCV)
{
  // maintain CCV in received Interest;
  NDV ++;
}
```

As an example, the CCV may be determined based on a storage space of a CS of the node and a network centrality or a node connectivity of the node. However, since the storage space of the CS is a variable value, the storage space of the CS may be completely filled in a short time when a large amount of content is requested. For this reason, an available cache size may be useless to determine the CCV f.

When the storage space of the CS is full, an available cache size may be reset virtually after a predetermined period of time with the contents cached in the CS being maintained in reality. Alternatively, a predetermined value may be assigned for an available cache size.

Accordingly, the CCV may be determined based on the virtual available cache size so that various nodes may be selected on the network.

FIG. 9 is a diagram illustrating an example of a method of determining a candidate node for caching a content using a content reply packet in CCN.

Referring to FIG. 9, a node serving a content owner transmits a content reply packet including a content "/naver.com/news/olympics.mp4" in response to a content request packet received from a content requester as described with reference to FIG. 8. In addition to the content, an oNDV, a dNDV, a CCVth, a maximum CCV, a weight value, and a lifetime of the content may be further included in the content reply packet (the maximum CCV, the weight value, and the lifetime of the content are not shown in FIG. 9). The maximum CCV is a CCV value included in the received content request packet, and the weight value is to be applied to the maximum CCV.

The oNDV is an NDV between a candidate node for caching the content and the content owner, and may be copied from the NDV stored in the received content request packet.

The dNDV is an NDV that decreases or changes with downstream forwarding of the content reply packet, and the content may be cached in a node having a dNDV of '0' or a neighboring node of the node having the dNDV of '0'.

The lifetime of the content is a length of time the content is to be cached. The content owner may set the lifetime to be proportional to a popularity of the content, and may transmit, in response to the received content request packet, the cached content together with the lifetime set for the content.

The CCVth is a lower bound for determining a node in which the content is to be cached among nodes or intermediate nodes on the transmission path. The content may be cached in a node having a CCV greater than a CCVth. A location of a candidate node and a number of candidate nodes may be determined based on the CCVth.

For example, when the CCVth has a first value, for example, '0', all nodes may cache a content. When the CCVth has a second value, for example, '0xFFFF', no nodes may cache a content.

When the CCVth has a third value, for example, '$CCV*e^{-p}$' wherein p denotes a popularity, a node having a CCV greater than the third value may cache a content.

As an example, the CCVth may be set to be a fourth value, for example, a community name of a popular content. Taking popular music, for instance, the CCVth may be set to a community name including music information associated with a popular music. In this case, only a node corresponding to the community name may cache the content.

As an example, an intermediate node may determine a candidate node for caching a content using a weight value in lieu of a CCVth determined based on a policy of a content owner. In this case, the weight value may be included in a content reply packet and transmitted to each node, along with the maximum CCV that is included in the received content request message.

When the intermediate node receives the content reply packet including the maximum CCV and the weight value, the intermediate node may calculate a CCVth using the weight value, and may determine whether the intermediate node is a candidate node for caching the content using the calculated CCVth. That is, the node may determine whether the node is to cache the content based on the CCVth calculated using the weight value.

The weight value may be calculated based on a popularity of the content, and may be applied to the maximum CCV included in the content request message. The weight value may be inversely proportional to the popularity, and may have a value, for example, between '0' and '1'. In this instance, a weight value closer to '0' may be assigned to a content having a higher popularity.

To allow a content having a high popularity to be cached in a larger number of intermediate nodes, the weight value may be set to be inversely proportional to the popularity, for example, to be closer to '0', by decreasing a weight value by which a maximum CCV is to be multiplied to reduce a new CCVth.

The node receiving the content reply packet may calculate a CCVth by multiplying the maximum CCV by the weight value.

The node may determine whether it is a candidate node for caching the content by comparing a CCV of the node to the calculated CCVth.

A node having a CCV greater than the calculated CCVth may be determined to be a candidate node for caching the corresponding content. For a method of determining whether to cache the content based on a result of comparing the CCV of the node to the calculated CCVth, reference is made to the description provided above of a case in which a CCVth is determined based on a policy of a content owner.

The node may store the weight value included in the content reply packet. When the node storing the weight value receives a content request message, the node may transmit to a next node a maximum CCV included in the content request message along with the stored weight value for use in determining whether to cache the content in a node on a path along which the content request is transmitted.

Also, the node may receive the CCVth determined based on the policy of the content owner and the weight value.

The intermediate node receiving the CCVth and the weight value may determine whether it is a candidate node for caching the content using a two-way process. That is, the node may determine whether it is a candidate node for caching the content using the CCVth immediately, and when processing a received content request message, may determine whether it is a candidate node for caching the content using the maximum CCV included in the content request packet and the weight value.

The content owner transmits to the node 4 a content reply packet 910 including the content "/naver.com/news/olympics.mp4", an oNDV '2' equal to NDV '2' included in the content request packet 850 in FIG. 8 that was forwarded to the content owner, dNDV '2', and CCVth '5' determined based on the policy of the content owner as described with reference to FIG. 8. The content owner initializes the dNDV to the value of the oNDV '2'.

The node 4 receives the content reply packet 910, and decreases the dNDV to '1'. Accordingly, the node 3 receives a content reply packet 930 including dNDV '1'. The node 3 decreases the dNDV to '0', and accordingly the node 2 receives a content reply packet 950 including dNDV '0'.

After the node 2 receives the content reply packet 950 including the dNDV '0' from the node 3, the node 2 determines whether the CCV '5' of the node 2 is greater than or equal to the CCVth '5' included in the content reply packet 950. When the CCV of the node 2 is greater than or equal to the CCVth, the node 2 caches the content Since the CCV '5' of the node 2 is equal to the CCVth '5', the node 2 caches the content.

A method of determining whether a node is a candidate node for caching the content among nodes on the transmission path may be coded as follows:

```
If (((dNDV = 0) or (dNDV < α*oNDV)) & (CCV >= CCVth))
{
    Cache content;
}
```

'α' may be determined based on a policy of the content owner or a popularity of the content, and may have a value of 0.5, for example.

When the lifetime of the cached content expires or when a content request packet for the cached content is received through a face different from a face stored in an FIB table of the node, the node 2 may delete the content cached in the node 2.

Figure 10:
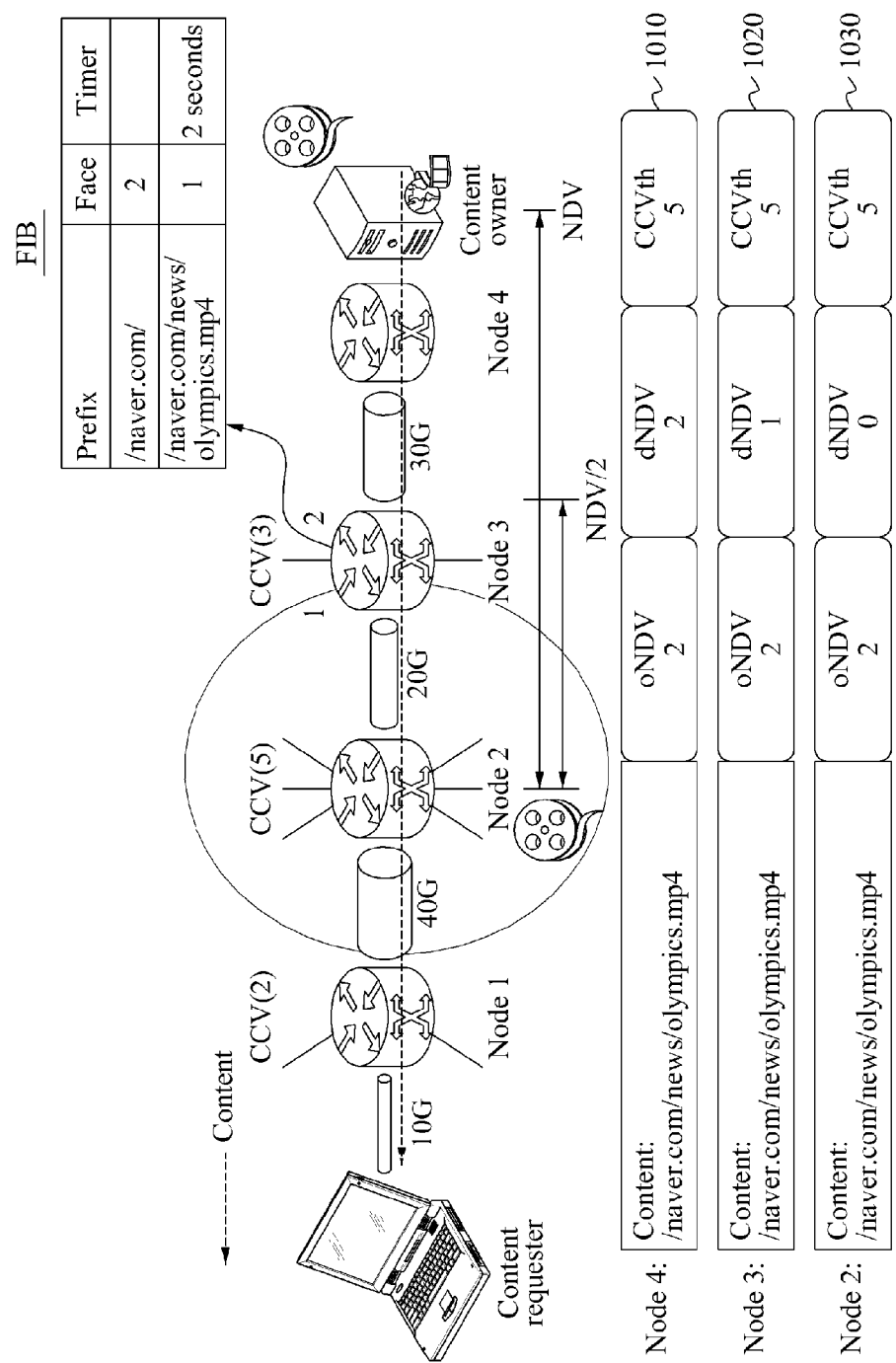
FIG. 10 is a diagram illustrating an example of a method of recognizing a node having a cached content using a forwarding information base (FIB) table of an outbound neighboring node in CCN.

FIG. 10 is a diagram illustrating an example of a method of recognizing a node having a cached content using an FIB table of an outbound neighboring node in CCN.

Referring to FIG. 10, a node 4 receives from a content owner a content reply packet 1010 including a content "/naver.com/news/olympics.mp4", an oNDV '2' equal to an NDV '2' included in a content request packet received by the content owner, a dNDV '2' equal to the oNDV '2', and a CCVth '5' determined based on a policy of the content owner.

After the node 4 receives the content reply packet 1010, the node 4 decreases the dNDV to '1'. Accordingly, a node 3 receives a content reply packet 1020 including dNDV '1' from the node 4.

The node 3 recognizes whether the node 3 or a neighboring node of the node 3 is to cache the content based on the dNDV.

To recognize a location in which the content is to be cached, the node 3 determines whether information included in the content reply packet satisfies (dNDV≤0.5*oNDV) & (CCV≤CCVth).

When (dNDV≤0.5*oNDV) & (CCV≤CCVth) is satisfied, the node 3 recognizes that the content is to be cached in a neighboring node of the node 3, and stores information associated with the content, for example, a name and a location of the content, in an FIB table of the node 3.

The node 3 as an outbound neighboring node may maintain timer information in the FIB of the node 3 as well as the name of the content, for example, a prefix of the content, and the transmission path, namely, a face. The timer information may indicate a length of time information associated with the content is to be stored.

The timer may contribute to efficient usage of entry resources of a routing table used for temporary caching, namely, an FIB table, and may be set based on the lifetime of the cached content.

The node may adjust the lifetime of the content through the timer in the table pointing to the cached content in response to the content reply packet being received.

For example, the node 3 may adjust the lifetime of the cached content using a least recently used (LRU) algorithm or a least frequently used (LFU) algorithm.

The node 3 may decrease a lifetime of a least recently used content or may adjust the lifetime to '0' based on an LRU algorithm. Also, the node 3 may decrease a lifetime of a least frequently used content or may adjust the lifetime to '0' based on an LFU algorithm.

The node 3 may transmit a content reply packet 1030 that is the same as the content reply packet 950 of FIG. 9 to the node 2.

The operation of the outbound neighboring node of the node having the cached content may be coded as follows:

```
If ((dNDV <= 0.5*oNDV) & (CCV <= CCVth))
{
    store content name & its location;
    set FIB expire timer;
}
```

As an example, among uncached nodes, the outbound neighboring node of the node having a cached content may store the name of the content rather than the content, and may point to the transmission path. Accordingly, caching resources in CCN may be saved.

Also, the node, whether singular or plural, storing the name of the content may compare a distance from the content owner to a distance from the node having the cached content, and may transmit a content request message to a closest location. In this instance, a hop count or a round trip time (RTT) may be used to compare the distances. Accordingly, a node in which a content is cached may be recognized in a simple manner and may perform routing, while eliminating the need for an additional control message.

To manage the name of the cached content, each node may set a lifetime of a corresponding entry in an FIB table to have a small value initially, and this value may be applied to all of the nodes in which the content is cached in accordance with the policy.

Even after the cached content is deleted, when the name of the content is maintained in the node, a false positive may occur.

Accordingly, when an additional request message for the cached content is transmitted to a node in which the name of the content is maintained, a node in which the content is cached may reset the lifetime of the content based on a popularity, a hit ratio, and a usage of the content, and may provide the reset information to a neighboring node. The likelihood of a false positive occurring may be reduced by updating information associated with the cached content on the network.

As an example, the node storing the name of the content may transmit the content request message to the node having the cached content rather than the content owner to enable the content requester to receive the content from the node having the cached content rather than from the content owner.

The node having the cached content may forward the updated lifetime of the cached content along with the cached content so that reliability of content-aware routing may be improved.

In CCN, the node may separately manage cached contents and original contents in a table. Accordingly, the node may transmit a content request message for an original content when needed, or may transmit an original content in response to a received content request message when a reply using a cached content fails.

Figure 11:
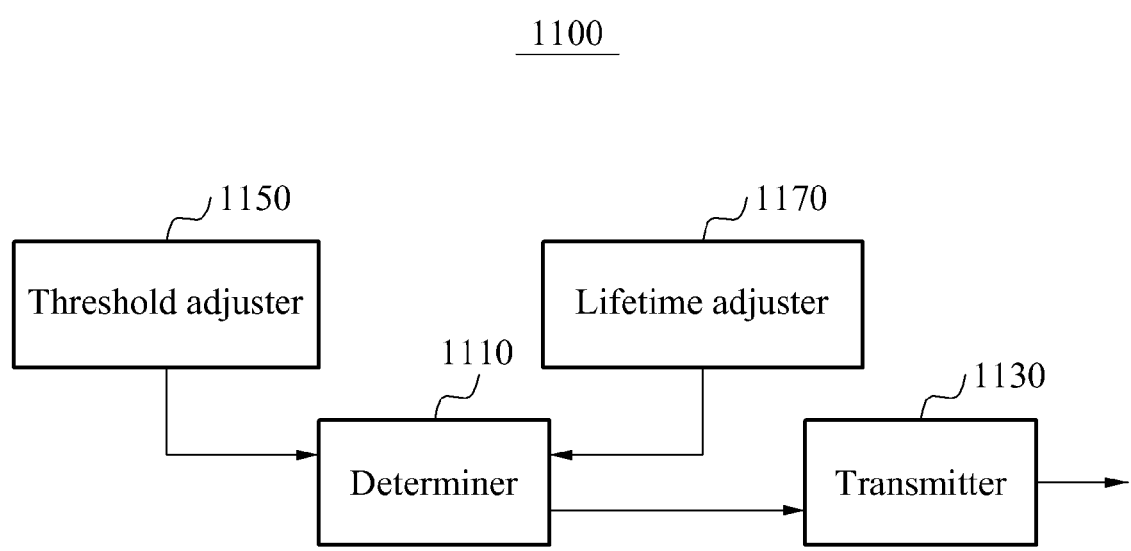
FIG. 11 is a block diagram illustrating an example of a content owner in CCN.

FIG. 11 is a block diagram illustrating an example of a content owner 1100 in CCN.

Referring to FIG. 11, the content owner 1100 includes a determiner 1110, a transmitter 1130, a threshold adjuster 1150, and a lifetime adjuster 1170.

The determiner 1110 determines a CCVth for determining a candidate node for caching a content based on a policy of the content owner 1100.

The policy of the content owner may be determined based on any one or any combination of a name of the content, a popularity of the content, an importance of the content, and a hit ratio of the content.

The CCVth may be used to determine a location of a candidate node and a number of candidate nodes.

For example, when the CCVth has a first value, all nodes may cache the content, when the CCVth has a second value, no nodes may cache the content, and when the CCVth has a third value, a node having a CCV greater than the third value may cache the content.

The transmitter 1130 transmits a content reply packet including the content and the CCVth in response to a content request packet received from a content requester.

The content reply packet may include any one or any combination of an oNDV between a candidate node and the content owner included in the content request packet, a dNDV that decreases with downstream forwarding of the content reply packet, a maximum CCV in the content request packet, a weight value, and a lifetime of the content The threshold adjuster 1150 adjusts the CCVth in response to a change in the policy of the content owner 1100.

The lifetime adjuster 1170 adjusts the lifetime of the content included in the content reply packet based on the policy of the content owner 1100.

Figure 12:
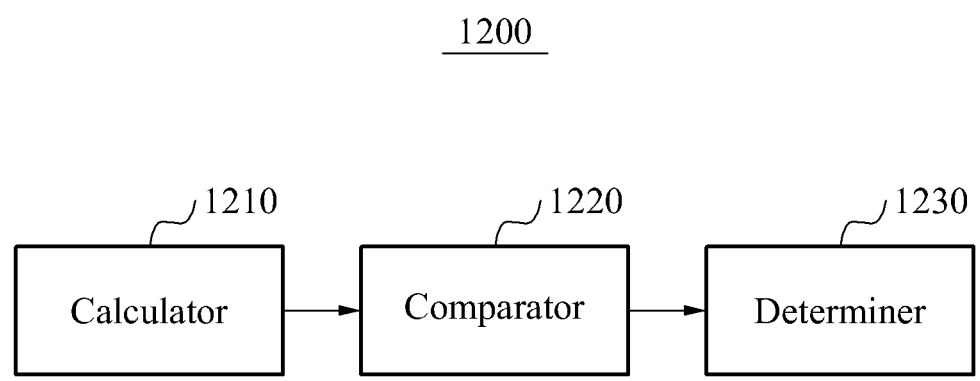
FIG. 12 is a block diagram illustrating an example of a node in CCN.

FIG. 12 is a block diagram illustrating an example of a node 1200 in CCN.

Referring to FIG. 12, the node 1200 includes a calculator 1210, a comparator 1220, and a determiner 1230.

The calculator 1210 calculates a CCV for identifying a candidate node for caching a content based on node-related information of the node 1200.

The node-related information may include any one or any combination of a cache size of the node, a popularity of the content requested from the node, a network centrality or a node connectivity of the node, a bandwidth of the node, and a name of the content.

The comparator 1220 compares the calculated CCV to a CCV included in a content request packet to be forwarded by the node 1200.

The determiner 1230 determines whether the node 1200 is a candidate node for caching the content based on a result of the comparing.

The determiner 1110, the transmitter 1130, the threshold adjuster 1150, the lifetime adjuster 1170, the calculator 1210, the comparator 1220, and the determiner 1230 illustrated in FIGS. 11 and 12 described above that perform the operations illustrated in FIGS. 3A, 3B, and 4-10 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of transmitting a content reply packet from a content owner in content-centric networking (CCN), the method comprising: determining, using a determining processor, a caching capability value threshold (CCVth) for determining a candidate node for caching a content based on a policy of the content owner; and transmitting, using a transmitting processor, a content reply packet including the content and the CCVth in response to a content request packet from a content requester, wherein all nodes cache the content in response to the CCVth having a first value, no nodes cache the content in response to the CCVth having a second value, and a node having a caching capability value (CCV) greater than a third value caches the content in response to the CCVth having the third value, wherein the content reply packet further comprises any one or any combination of an original network distance value (oNDV) between the candidate node and the content owner included in the content request packet, a decreasing network distance value (dNDV) that decreases with downstream forwarding of the content reply packet, a maximum CCV included in the content request packet, a weight value, and a lifetime of the content.

2. The method of claim 1, wherein the policy of the content owner is based on any one or any combination of a name of the content, a popularity of the content, an importance of the content, and a hit ratio of the content.

3. The method of claim 1, further comprising adjusting, using a threshold adjusting processor, the CCVth in response to a change of the policy of the content owner.

4. The method of claim 1, wherein the CCVth is used to determine a location of a candidate node for caching the content and a number of candidate nodes for caching the content.

5. The method of claim 1, further comprising adjusting, using a lifetime adjusting processor, a lifetime of the content included in the content reply packet based on the policy of the content owner.

6. A non-transitory computer-readable storage medium storing instructions that when executed by a processor, cause the processor to perform the method of claim 1.

7. A method of transmitting a content request packet from a node in content-centric networking (CCN), the method comprising: calculating, using a calculating processor, a caching capability value (CCV) for identifying a candidate node for caching a content based on node-related information of the node; comparing, using a comparing processor, the calculated CCV to a CCV included in a content request packet to be forwarded by the node; determining, using a determining processor, whether the node is a candidate node for caching the content based on a result of the comparing; determining, using the determining processor, whether the node is a candidate node for caching the content using the weight value in response to the content reply packet including the weight value for the CCV, wherein the determining of whether the node is a candidate node for caching the content using the weight value comprises calculating, using the calculating processor, a CCVth using a maximum CCV included in the content request packet and the weight value, wherein the maximum CCV is a maximum CCV among all intermediate nodes in a transmission path along which the content request packet was transmitted from the content requester to the content owner; and determining, using the determining processor whether the node is a candidate node for caching the content using the calculated CCVth.

8. The method of claim 7, wherein the content request packet comprises a name of the content, and caching-related information comprising a CCV of a candidate node and a network distance value (NDV) between a content owner and the candidate node.

9. The method of claim 7, wherein the node-related information comprises any one or any combination of a cache size of the node, a popularity of the content requested from the node, a network centrality or a node connectivity of the node, a bandwidth of the node, and a name of the content.

10. The method of claim 7, wherein the determining of whether the node is a candidate node for caching the content based on the result of the comparing,
in response to the calculated CCV being greater than the CCV included in the content request packet to be forwarded by the node: updating the CCV included in the content request packet to the calculated CCV; and initializing a network distance value (NDV) between a content owner and a candidate node included in the content request packet.

11. The method of claim 7, wherein the determining of whether the node is a candidate node for caching the content based on the result of the comparing comprises, in response to the calculated CCV being less than or equal to the CCV included in the content request packet to be forwarded by the node: maintaining the CCV included in the content request packet; and increasing a network distance value (NDV) between a content owner and a candidate node included in the content request packet.

12. The method of claim 7, wherein a content reply packet transmitted in response to the content request packet comprises any one or any combination of the content, an original network distance value (oNDV) between a content owner and a candidate node included in the content request packet, a decreasing network distance value (dNDV) that decreases with downstream forwarding of the content reply packet, a CCVth, a maximum CCV included in the content request packet, a weight value, and a lifetime of the content.

13. The method of claim 12, further comprising forwarding, using the node, the content reply packet downstream based on the dNDV.

14. The method of claim 13, further comprising decreasing, using the node, the dNDV included in the content reply packet as the content reply packet is forwarded downstream.

15. The method of claim 14, further comprising recognizing, using the node, whether the node or a neighboring node of the de is to cache the content based on the dNDV.

16. The method of claim 12, further comprising caching, using the node, the content in the node based on results of comparing the oNDV to the dNDV and comparing the calculated CCV to the CCVth.

17. The method of claim 16, further comprising maintaining, using the node, a timer in a forwarding interest base (FIB) table of an outbound neighboring node of the node, the timer being set based on the lifetime of the content cached in the node.

18. The method of claim 17, further comprising adjusting, using the node, the lifetime of the cached content using a least recently used (LRU) algorithm or a least frequently used (LFU) algorithm.

19. The method of claim 16, further comprising deleting, using the node, the cached content in response to the lifetime of the cached content expiring or in response to the content request packet for the cached content being received through a face different from a face stored in forwarding interest base (FIB) table of the node.

20. The method of claim 7, wherein the determining of whether the node is a candidate node for caching the content using the calculated CCVth comprises:
comparing, using the comparing processor, the calculated CCVth to the calculated CCV; and determining, using the determiner, whether the node is a candidate node for caching the content based on a result of the comparing of the calculated CCVth to the calculated CCV.

21. The method of claim 20, wherein the determining of whether the node is a candidate node for caching the content comprises determining the node to be a candidate node for caching the content in response to the calculated CCV being greater than the calculated CCVth.

22. The method of claim 12, further comprising storing, using the node, the weight value in the node.

23. The method of claim 22, further comprising forwarding, using the node, the stored weight value to a next node.

24. A method of caching content in an intermediate node in content-centric networking (CCN) using a node serving a content requester, the method comprising: identifying, using the node serving the content requester, an intermediate node between the content requester and a content owner in which a content requested by the content requester is to be cached based on node-related information of the intermediate node and information included in a content reply packet comprising the content transmitted from the content owner in response to a content request packet transmitted from the content requester to the content owner via the intermediate node, wherein the identifying comprises receiving the content reply packet in the intermediate node; identifying the intermediate node as an intermediate node in which the content requested by the content requester is to be cached in response to a caching capability
value (CCV) of the intermediate node being greater than or equal to a caching capability value threshold (CCVth) included in the content reply packet; identifying the intermediate node as not being an intermediate node in which the content requested by the requester is to be cached in response to the CCV being less than the caching CCVth, wherein the CCVth is calculated based on a maximum CCV included in the content reply packet and a weight value included in the content reply packet, wherein the maximum CCV is a maximum CCV among all intermediate nodes in a transmission path along which the content request packet was transmitted from the content requester to the content owner; and caching, using the identified intermediate node, the content included in the content reply packet in the identified intermediate node in which the content is to be cached.

25. The method of claim 24, wherein the identifying comprises: receiving the content reply packet in an intermediate node; identifying the intermediate node as an intermediate node in which the content requested by the content requester is to be cached in response to a caching capability value (CCV) of the intermediate node being greater than or equal to a caching capability value threshold (CCVth) included in the content reply packet and a decreasing network distance value (dNDV) included in the content reply packet being equal to zero, the dNDV having a value that decreases with downstream forwarding of the content reply packet; and identifying the intermediate node as not being an intermediate node in which the content requested by the requester is to be cached in response to the CCV being less than the caching CCVth or the dNDV not being equal to zero.

* * * * *